(12) United States Patent
Wang et al.

(10) Patent No.: US 8,044,668 B2
(45) Date of Patent: Oct. 25, 2011

(54) METHOD AND SYSTEM FOR CALIBRATING MEASUREMENT TOOLS FOR SEMICONDUCTOR DEVICE MANUFACTURING

(75) Inventors: Eugene Wang, Shanghai (CN); Yu Chen, Shanghai (CN)

(73) Assignee: Semiconductor Manufacturing International (Shanghai) Corporation, Shanghai (CN)

(*) Notice: Subject to any disclaimer, the term of this patent is extended or adjusted under 35 U.S.C. 154(b) by 0 days.

(21) Appl. No.: 11/193,016

(22) Filed: Jul. 29, 2005

(65) Prior Publication Data

US 2007/0013388 A1    Jan. 18, 2007

(30) Foreign Application Priority Data

Jul. 14, 2005 (CN) .......................... 2005 1 0027816

(51) Int. Cl.
*G01R 35/00* (2006.01)
(52) U.S. Cl. .................... 324/601; 324/608; 324/635
(58) Field of Classification Search .............. 324/601, 324/158.1, 755; 73/1.89
See application file for complete search history.

(56) References Cited

U.S. PATENT DOCUMENTS

| | | | | | |
|---|---|---|---|---|---|
| 5,539,305 | A * | 7/1996 | Botka | .................... | 324/158.1 |
| 5,920,067 | A * | 7/1999 | Cresswell et al. | ............ | 250/306 |
| 6,016,684 | A * | 1/2000 | Scheer et al. | .................. | 73/1.89 |
| 6,025,787 | A * | 2/2000 | Poduje et al. | ............ | 340/870.04 |
| 6,532,428 | B1 * | 3/2003 | Toprac | ............................ | 702/97 |
| 6,654,698 | B2 * | 11/2003 | Nulman | .......................... | 702/85 |
| 6,762,418 | B2 * | 7/2004 | Lambert et al. | .......... | 250/455.11 |
| 6,815,964 | B2 * | 11/2004 | Di Gregorio et al. | ........ | 324/758 |
| 6,830,943 | B1 * | 12/2004 | Lo et al. | ............................ | 438/18 |
| 6,890,773 | B1 * | 5/2005 | Stewart | ............................ | 438/14 |
| 6,943,878 | B2 * | 9/2005 | Fisher et al. | .................... | 356/300 |
| 6,963,209 | B1 * | 11/2005 | Gailus et al. | .................. | 324/755 |
| 7,027,146 | B1 * | 4/2006 | Smith et al. | ................ | 356/243.6 |
| 7,262,865 | B2 * | 8/2007 | Mui et al. | ...................... | 356/630 |
| 7,361,941 | B1 * | 4/2008 | Lorusso et al. | ............... | 257/100 |
| 2004/0218173 | A1 | 11/2004 | Fisher et al. | | |

OTHER PUBLICATIONS

Taylor and Kuyatt, Guidelines for Evaluating and Expressing the Uncertainty of NIST Measurement Results, 1994, US Dept of Commerce, National Institute of Standards and Technology, 1994 Edition, pp. 2, 3, 4, and 7.*

NIST Policy on Traceability, http://ts.nist.gov/traceability, Feb. 2, 2006, p. 1-30.*

SISA Statistical Analysis F-test, Simple Interactive Statistical Analysis, www.qualitativeskills.com/sisa/calculations/; www.eeescience.utoledo.edu.*

(Continued)

*Primary Examiner* — Thomas Valone
(74) *Attorney, Agent, or Firm* — Kilpatrick Townsend and Stockton LLP

(57) ABSTRACT

A method and system for calibrating a plurality of measurement systems. The method includes obtaining a first plurality of calibration standards. The first plurality of calibration standards is associated with a plurality of predetermined values. Additionally, the method includes measuring the first plurality of calibration standards by a plurality of measurement systems to obtain a first plurality of measured values, processing information associated with the first plurality of measured values, and selecting a first measurement system from the plurality of measurement systems based on at least information associated with the first plurality of measured values. Moreover, the method includes calibrating the first measurement system with the first plurality of calibration standards, obtaining a second plurality of calibration standards, and measuring the second plurality of calibration standards by the first measurement system to obtain a second plurality of measured values.

22 Claims, 1 Drawing Sheet

OTHER PUBLICATIONS

Medcalc, Easy to Use Statistical Software, Ver. 11-1, 1993, F-Test and p- value, http://www.medcalc.be/manual/comparison_of_standard_deviations_f-test.php.*

Arsham, Professor Hossein, "P-values for the Popular Distributions", 1996, Ubalt, http://home.ubalt.edu/ntsbarsh/Business-Stat/otherapplets/pvalues.htm, p. 1-10.*

F-Test, Wikipedia, http://en.wikipedia.org/wiki/F-test, p. 1-5.*

P-value, Wikipedia, http://en.wikipedia.org/wiki/P-value, p. 1-3.*

AIAG, MSA-3, Measurement Systems Analysis Manual, Third Edition, Automotive Industry Action Group, May 1, 2003.

* cited by examiner

METHOD AND SYSTEM FOR CALIBRATING MEASUREMENT TOOLS FOR SEMICONDUCTOR DEVICE MANUFACTURING

CROSS-REFERENCES TO RELATED APPLICATIONS

This application claims priority to Chinese Patent Application No. 200510027816.4 (EastIPRef. No. 05NI2971-1129-CHH), filed Jul. 14, 2005, entitled "Method and System for Calibrating Measurement Tools for Semiconductor Device Manufacturing," by inventors Eugene Wang and Yu Chen, commonly assigned, incorporated by reference herein for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to integrated circuits and their processing for the manufacture of semiconductor devices. More particularly, the invention provides a method and system for calibrating measurement tools for semiconductor device manufacturing. Merely by way of example, the invention has been applied to establishing traceability of calibration standards. But it would be recognized that the invention has a much broader range of applicability.

Integrated circuits or "ICs" have evolved from a handful of interconnected devices fabricated on a single chip of silicon to millions of devices. Current ICs provide performance and complexity far beyond what was originally imagined. In order to achieve improvements in complexity and circuit density (i.e., the number of devices capable of being packed onto a given chip area), the size of the smallest device feature, also known as the device "geometry", has become smaller with each generation of ICs. Semiconductor devices are now being fabricated with features less than a quarter of a micron across.

Increasing circuit density has not only improved the complexity and performance of ICs but has also provided lower cost parts to the consumer. An IC fabrication facility can cost hundreds of millions, or even billions, of dollars. Each fabrication facility will have a certain throughput of wafers, and each wafer will have a certain number of ICs on it. Therefore, by making the individual devices of an IC smaller, more devices may be fabricated on each wafer, thus increasing the output of the fabrication facility. Making devices smaller is very challenging, as each process used in IC fabrication has a limit. An example of such a limit is calibrating measurement tools for semiconductor device manufacturing.

Fabrication of custom integrated circuits using chip foundry services has evolved over the years. Fabless chip companies often design the custom integrated circuits. Such custom integrated circuits usually require a set of custom masks commonly called "reticles" to be manufactured. A chip foundry company called Semiconductor International Manufacturing Company (SMIC) of Shanghai, China is an example of a chip company that performs foundry services. Although fabless chip companies and foundry services have increased through the years, many limitations still exist. For example, in semiconductor industry, the calibration of measurement tools is very important. The measurement tools often need to be calibrated daily against high precision standards to make the tools work accurately and smoothly. For calibration standards, the International Organization for Standardization (ISO) often requires these standards being traceable to a worldwide acceptable origin. For example, the National Institute of Standards and Technology (NIST) in the United States is a worldwide acceptable origin.

According to certain conventional calibration techniques, a semiconductor company purchases a set of wafers that are used as calibration standards and traceable to a worldwide acceptable origin such as NIST. These wafers often are called golden wafers, and they are for example VLSI wafers. The golden wafers usually are very expensive, and the calibration processes often are consumable. In order to lower calibration costs, the semiconductor company often does not use the golden wafers for daily calibrations. Moreover, to simulate actual working conditions, the semiconductor company may select a set of frequently desired values, and calibrate the measurement tools at these special levels. But it is often difficult to obtain golden wafers with all these special levels at reasonable costs.

From the above, it is seen that an improved technique for calibrating measurement tools is desired.

BRIEF SUMMARY OF THE INVENTION

The present invention is directed to integrated circuits and their processing for the manufacture of semiconductor devices. More particularly, the invention provides a method and system for calibrating measurement tools for semiconductor device manufacturing. Merely by way of example, the invention has been applied to establishing traceability of calibration standards. But it would be recognized that the invention has a much broader range of applicability.

In a specific embodiment, the invention provides a method for calibrating a plurality of measurement systems. The method includes obtaining a first plurality of calibration standards. The first plurality of calibration standards is associated with a plurality of predetermined values. Additionally, the method includes measuring the first plurality of calibration standards by a plurality of measurement systems to obtain a first plurality of measured values, processing information associated with the first plurality of measured values, and selecting a first measurement system from the plurality of measurement systems based on at least information associated with the first plurality of measured values. Moreover, the method includes calibrating the first measurement system with the first plurality of calibration standards, obtaining a second plurality of calibration standards, and measuring the second plurality of calibration standards by the first measurement system to obtain a second plurality of measured values. Each of the second plurality of measured values corresponding to one of the second plurality of calibration standards. Also, the method includes calibrating a second measurement system of the plurality of measurement systems with the second plurality of calibration standards associated with the second plurality of measured values.

According to another embodiment of the present invention, a method for calibrating a plurality of measurement systems includes obtaining a first plurality of calibration standards. The first plurality of calibration standards are associated with a plurality of predetermined values and calibrated against at least a first standard associated with a first worldwide acceptable origin. Additionally, the method includes measuring the first plurality of calibration standards by a plurality of measurement systems to obtain a first plurality of measured values, processing information associated with the first plurality of measured values, and selecting a first measurement system from the plurality of measurement systems based on at least information associated with the first plurality of measured values. Moreover, the method includes calibrating the first measurement system with a second plurality of calibration standards. The second plurality of calibration standards are calibrated against at least a second standard associated with a second worldwide acceptable origin. Also, the method includes obtaining a third plurality of calibration standards, and measuring the third plurality of calibration standards by the first measurement system to obtain a second plurality of measured values. Each of the second plurality of measured values corresponds to one of the third plurality of calibration standards. Additionally, the method includes calibrating a second measurement system of the plurality of measurement systems with the third plurality of calibration standards associated with the second plurality of measured values.

According to yet another embodiment of the present invention, a method for calibrating a plurality of measurement systems includes obtaining a first plurality of calibration standards. The first plurality of calibration standards is associated with a plurality of predetermined values. Additionally, the method includes measuring the first plurality of calibration standards by a plurality of measurement systems to obtain a first plurality of measured values, processing information associated with the first plurality of measured values, and determining a plurality of uncertainties for the plurality of measurement systems based on information associated with the first plurality of measured values. Moreover, the method includes selecting a first measurement system from the plurality of measurement systems based on at least information associated with the plurality of uncertainties, and calibrating the first measurement system with the first plurality of calibration standards. Also, the method includes obtaining a second plurality of calibration standards, measuring the second plurality of calibration standards by the first measurement system to obtain a second plurality of measured values, and calibrating a second measurement system of the plurality of measurement systems with the second plurality of calibration standards associated with the second plurality of measured values.

Many benefits are achieved by way of the present invention over conventional techniques. Some embodiments provide reliable calibrations of measurement tools. Certain embodiments provide a process that is compatible with conventional process technology without substantial modifications to conventional equipment and processes. Some embodiments of the present invention provide cost-effective calibration standards that can be used to periodically calibrate measurement tools. For example, the calibration standards are traceable to a worldwide acceptable origin. Certain embodiments of the present invention can improve quality of mass production by providing accurate measurement systems. Some embodiments of the present invention provide a traceable calibration chain for cross-fabrication-plant metrology tools. Certain embodiments of the present invention apply statistical methods to identify a golden tool to make the calibration chain traceable. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DETAILED DESCRIPTION OF THE INVENTION

The present invention is directed to integrated circuits and their processing for the manufacture of semiconductor devices. More particularly, the invention provides a method and system for calibrating measurement tools for semiconductor device manufacturing. Merely by way of example, the invention has been applied to establishing traceability of calibration standards. But it would be recognized that the invention has a much broader range of applicability.

Figure 1:
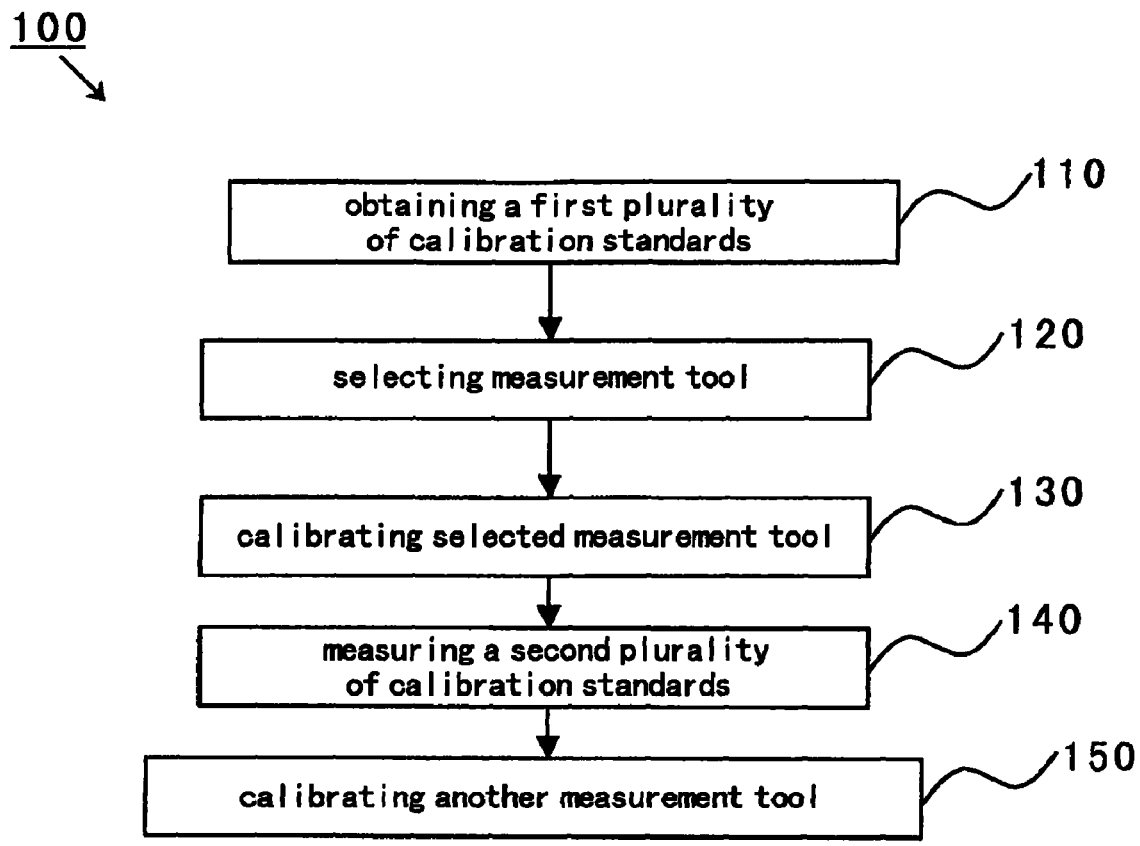
FIG. 1 is a simplified method for calibrating measurement tools according to an embodiment of the present invention.

FIG. 1 is a simplified method for calibrating measurement tools according to an embodiment of the present invention. This diagram is merely an example, which should not unduly limit the scope of the claims herein. The method 100 includes the following processes:

1. Process 110 for obtaining a first plurality of calibration standards;
2. Process 120 for selecting measurement tool;
3. Process 130 for calibrating selected measurement tool;
4. Process 140 for measuring a second plurality of calibration standards;
5. Process 150 for calibrating another measurement tool.

The above sequence of processes provides a method according to an embodiment of the present invention. Other alternatives can also be provided where processes are added, one or more processes are removed, or one or more processes are provided in a different sequence without departing from the scope of the claims herein. Future details of the present invention can be found throughout the present specification and more particularly below.

At the process 110, a first plurality of calibration standards is obtained. In one embodiment, the first plurality of calibration standards is traceable to a worldwide acceptable origin. For example, the National Institute of Standards and Technology (NIST) in the United States is a worldwide acceptable origin. In another embodiment, the first plurality of calibration standards includes wafers, which are also called golden wafers. For example, the golden wafers are VLSI wafers. In yet another embodiment, the first plurality of calibration standards provides standards for a given property. For example, the property includes sheet resistance, film thickness, and/or critical dimension.

At the process 120, a measurement tool is selected using the first plurality of calibration standards. In one embodiment, the selected measurement tool is called a golden measurement tool. In another embodiment, the measurement tool is selected from a plurality of measurement tools. For example, each of the plurality of measurement tools includes a measurement system. In another example, the selected measurement tool is the best tool among the plurality of tools that performs the same measurement function. In yet another embodiment, a plurality of tools is used to measure the given property of the first plurality of calibration standards, and the measured values are processed. The measurement tool is selected based on the measurement values and the true values of the first plurality of calibration standards. For example, the plurality of tools includes a plurality of measurement systems.

In yet another embodiment, the measurement tool is selected based on measurement bias, linear performance, and/or total uncertainty. For example, the measurement bias is equal to the difference between the measured value and the true value of one of the first plurality of calibration standards. In another example, the measurement bias is determined based on the differences between the measured values and the corresponding true values of the first plurality of calibration standards. In one embodiment, the measurement bias is equal to the average of the differences between the measured values and the corresponding true values of the first plurality of calibration standards.

In yet another example, the linear performance is determined by measuring the given property of the first plurality of calibration standards. The first plurality of calibration standards corresponds to different true values for the given property. In one embodiment, the measurement results are plotted with vertical axis representing measurement values and horizontal axis representing true values. The plotted data points are fit linearly, and the angle between the fitted straight line and the horizontal axis represents the liner performance. For example, the angle is equal to 45 degrees for ideal linear performance. In another example, the Measurement System Analysis (MSA) regulated by TS16949 can provide procedures to determine the linearly performance of a metrology tool.

In yet another example, the total uncertainty is calculated based on individual uncertainties for individual true value of the first plurality of calibration standards. In one embodiment, an individual uncertainty is obtained by performing a plurality of measurements for the same true value. For example, the plurality of measurements can be performed on the same one of the first plurality of calibration standards and/or several ones of the first plurality of calibration standards. The several ones have the same true value for the given property. In another embodiment, the total uncertainty is represented by a probability that the measured true value is included within a certain range. For example, the total uncertainty is similar to a confidence interval. If a measurement scheme including the significance level is determined, the width of the confidence interval depends on the standard deviation of the measurement process.

According to an embodiment of the present invention, the first plurality of calibration standards includes N calibration standards with different true values. A measurement tool is used to measure each of the N calibration standards for M times. N and M each are a positive integer. Hence a total of N×M measurements are performed for the measurement tool. These measurement results are represented by $x_{ij}$ (i=1, 2, ..., N, j=1, 2, ..., M). For each true value, the measurement mean $\bar{x}_i$ is determined by $$\bar{x}_i = \frac{1}{M} \sum_{j=1}^{M} x_{ij} \quad \text{(Equation 1)}$$

Then the individual uncertainty $y_{ij}$ is equal to the standardized uncertainty or comparative uncertainty of $x_{ij}$ as follows:

$$y_{ij} = \frac{x_{ij} - \bar{x}_i}{\bar{x}_i} \quad \text{(Equation 2)}$$

The total uncertainty is equal to the total process measurement standard deviation of the measurement tool as follows:

$$\text{total uncertainty } y = \sqrt{\frac{1}{N \times M - 1} \sum_{i=1}^{N} \sum_{j=1}^{M} y_{ij}^2} \quad \text{(Equation 3)}$$

According to another embodiment of the present invention, the total uncertainty for each of the plurality of measurement tools is determined. These total uncertainties are processed, and the measurement tool is selected from the plurality of measurement tools based on these total uncertainties. For example, the selected measurement tool has the least total uncertainty. In another example, the F-test is used to determine differences between these total uncertainties.

According to another embodiment of the present invention, the measurement bias is not an important factor in selecting the measurement tool. For example, the hardware and software attached to each of the plurality of measurement tools are used to minimize the bias close to zero.

Following is an example illustrating an embodiment of the process 120. Suppose there are A, B, C, D four similar thickness measurement tools in a same functional working group, and there are 6 working thickness levels. Correspondingly, there exist 6 standard wafers for the first plurality of calibration standards. At each working level, measurements are repeated for 100 times against the corresponding standard wafer. Therefore, a total of 600 measurement records are obtained for each thickness measurement tool.

For measurement tool A, each measurement record is represented as $x_{ij}$ (i=1, 2, ..., 6, j=1, 2, ..., 100). For each level i, the measurement mean $\bar{x}_i$ is calculated as $$\bar{x}_i = \frac{1}{100} \sum_{j=1}^{100} x_{ij} \quad \text{(Equation 4)}$$

Then the individual uncertainty $y_{ij}$ is equal to the standardized uncertainty or comparative uncertainty of $x_{ij}$ according to Equation 2. As shown in Equation 2, the divider is $\bar{x}_i$, $y_{ij}$ is standardized.

$$\bar{y}_i = \frac{1}{100} \sum_{j=1}^{100} y_{ij} = 0.$$

Therefore, all $y_{ij}$ (i=1, 2, ..., 6, j=1, 2, ..., 100) are homogeneous.

Accordingly, the total uncertainty is equal to the total process measurement standard deviation of the measurement tool as follows:

$$\sqrt{\frac{1}{600 - 1} \sum_{i=1}^{6} \sum_{j=1}^{100} y_{ij}^2} \quad \text{(Equation 5)}$$

Similarly, the total uncertainties are also obtained for the tools B, C and D. The F-test is then used to determine differences between the total uncertainties for the tools A, B, C, and D, and hence the tool with the least total uncertainty is identified.

For example, Table 1 shows the total uncertainties for the tools A, B, C, and D, and Table 2 shows the results of the F-test regarding the differences between the total uncertainty for the tool A and the total uncertainties for the tools B, C, and D.

TABLE 1

|  | Total Uncertainty |
| --- | --- |
| Tool A | 0.002129 |
| Tool B | 0.003960 |
| Tool C | 0.002599 |
| Tool D | 0.002319 |

TABLE 2

|  | p-value | df |
| --- | --- | --- |
| Tools A v. B | 0.0001 | 599 |
| Tools A v. C | 0.0001 | 599 |
| Tools A v. D | 0.0182 | 599 |

As shown in Tables 1 and 2, the tool A has statistically significant smaller total uncertainty than the tools B, C and D. Additionally, regression tests show all of the tools A, B, C, and D have good linear performance with $R^2=0.99$. Accordingly, the tool A is selected for the process 120 as the golden tool.

Returning to FIG. 1, at the process 130, the selected measurement tool is calibrated. In one embodiment, the calibration uses a plurality of calibration standards that is traceable to a worldwide acceptable origin. For example, the National Institute of Standards and Technology (NIST) in the United States is a worldwide acceptable origin. In another example, the plurality of calibration standards and the first plurality of calibration standards used for the process 120 are traceable to the same worldwide acceptable origin or different worldwide acceptable origins. In yet another example, the plurality of calibration standards is the first plurality of calibration standards used for the process 120.

At the process 140, a second plurality of calibration standards is measured by the selected measurement tool. In one embodiment, the process 140 includes obtaining the second plurality of calibration standards. In another embodiment, the second plurality of calibration standards provides standards for a given property. For example, the given property is the same as the property for which the first plurality of calibration standards provides standards. In another example, the given property includes sheet resistance, film thickness, and/or critical dimension. In yet another example, the standards provided by the second plurality of calibration standards are intended to be equal or close to a set of frequently desired values.

In another embodiment, at the process 140, the measured values of the second plurality of calibration standards for a given property for which the second plurality of calibration standards provides standards are used as the true values of the second plurality of calibration standards. For example, the selected measurement tool is used to measure the film thickness on a set of working standard wafers with different levels of film thickness. The measurement results are used as the true values of the film thickness on each corresponding working standard wafer. In another example, the set of working standard wafers are made from inexpensive regular bare wafers, each intended to match a frequently used working measurement level.

At the process 150, another measurement tool is calibrated by the second plurality of standards. For example, the another measurement tool is one of the plurality of the tools from which the measurement tool is selected at the process 120. In another example, the process 150 is repeated for calibrating all of the plurality of the tools other than the measurement tool selected at the process 120.

As discussed above and further emphasized here, FIG. 1 is merely an example, which should not unduly limit the scope of the claims. According to one embodiment of the present invention, the method 100 provides the second plurality of calibration standards that is traceable to a worldwide acceptable origin. For example, the National Institute of Standards and Technology (NIST) in the United States is a worldwide acceptable origin.

Figure 2:
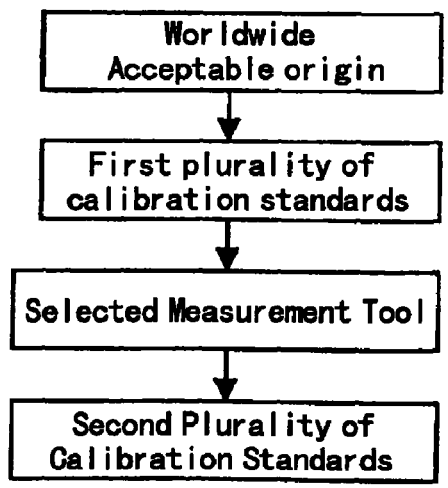
FIG. 2 is a simplified diagram showing traceability of second plurality of calibration standards according to an embodiment of the present invention.

FIG. 2 is a simplified diagram showing traceability of second plurality of calibration standards according to an embodiment of the present invention. This diagram is merely an example, which should not unduly limit the scope of the claims. One of ordinary skill in the art would recognize many variations, alternatives, and modifications. As shown in FIG. 2, the true values of the second plurality of calibration standards are determined by the selected measurement tools at the process 140. The measurement tool is selected using the first plurality of calibration standards at the process 120 and calibrated by a plurality of calibration standards at the process 130. For example, the plurality of calibration standards is the first plurality of calibration standards. Both the first plurality of calibration standards used for selection and the plurality of calibration standards used for calibration are calibrated against standards from a worldwide acceptable origin. For example, the National Institute of Standards and Technology (NIST) in the United States is a worldwide acceptable origin. According to an embodiment of the present invention, the standards from the worldwide acceptable origin are calibrated against standards from International Bureau of Weights and Measures (BIMP).

As discussed above and further emphasized here, FIGS. 1 and 2 are merely examples, which should not unduly limit the scope of the claims. One of ordinary skill in the art would recognize many variations, alternatives, and modifications. In one embodiment, the method 100 is used to calibrate measurement tools for applications other than semiconductor device manufacturing. In another embodiment, the measurement tools under calibration are used to measure parameters for various types of properties. For example, the property includes sheet resistance, film thickness, and/or critical dimension. In yet another embodiment, a semiconductor company operates several wafer fabrication plants. For each measurement function, there may be many tools of one or more brands located in different wafer fabrication plants. From harmonization point of view, all of these tools are calibrated against the same set of traceable standard wafers of several thickness levels according to the method 100.

According to another embodiment of the present invention, a method for calibrating a plurality of measurement systems includes obtaining a first plurality of calibration standards. The first plurality of calibration standards is associated with a plurality of predetermined values. Additionally, the method includes measuring the first plurality of calibration standards by a plurality of measurement systems to obtain a first plurality of measured values, processing information associated with the first plurality of measured values, and selecting a first measurement system from the plurality of measurement systems based on at least information associated with the first plurality of measured values. Moreover, the method includes calibrating the first measurement system with the first plurality of calibration standards, obtaining a second plurality of calibration standards, and measuring the second plurality of calibration standards by the first measurement system to obtain a second plurality of measured values. Each of the second plurality of measured values corresponding to one of the second plurality of calibration standards. Also, the method includes calibrating a second measurement system of the plurality of measurement systems with the second plurality of calibration standards associated with the second plurality of measured values. For example, the method is implemented according to the method 100.

According to yet another embodiment of the present invention, a method for calibrating a plurality of measurement systems includes obtaining a first plurality of calibration standards. The first plurality of calibration standards are associated with a plurality of predetermined values and calibrated against at least a first standard associated with a first worldwide acceptable origin. Additionally, the method includes measuring the first plurality of calibration standards by a plurality of measurement systems to obtain a first plurality of measured values, processing information associated with the first plurality of measured values, and selecting a first measurement system from the plurality of measurement systems based on at least information associated with the first plurality of measured values. Moreover, the method includes calibrating the first measurement system with a second plurality of calibration standards. The second plurality of calibration standards are calibrated against at least a second standard associated with a second worldwide acceptable origin. Also, the method includes obtaining a third plurality of calibration standards, and measuring the third plurality of calibration standards by the first measurement system to obtain a second plurality of measured values. Each of the second plurality of measured values corresponds to one of the third plurality of calibration standards. Additionally, the method includes calibrating a second measurement system of the plurality of measurement systems with the third plurality of calibration standards associated with the second plurality of measured values. For example, the method is implemented according to the method 100.

According to yet another embodiment of the present invention, a method for calibrating a plurality of measurement systems includes obtaining a first plurality of calibration standards. The first plurality of calibration standards is associated with a plurality of predetermined values. Additionally, the method includes measuring the first plurality of calibration standards by a plurality of measurement systems to obtain a first plurality of measured values, processing information associated with the first plurality of measured values, and determining a plurality of uncertainties for the plurality of measurement systems based on information associated with the first plurality of measured values. Moreover, the method includes selecting a first measurement system from the plurality of measurement systems based on at least information associated with the plurality of uncertainties, and calibrating the first measurement system with the first plurality of calibration standards. Also, the method includes obtaining a second plurality of calibration standards, measuring the second plurality of calibration standards by the first measurement system to obtain a second plurality of measured values, and calibrating a second measurement system of the plurality of measurement systems with the second plurality of calibration standards associated with the second plurality of measured values. For example, the method is implemented according to the method 100.

The present invention has various advantages. Some embodiments provide reliable calibrations of measurement tools. Certain embodiments provide a process that is compatible with conventional process technology without substantial modifications to conventional equipment and processes. Some embodiments of the present invention provide cost-effective calibration standards that can be used to periodically calibrate measurement tools. For example, the calibration standards are traceable to a worldwide acceptable origin. Certain embodiments of the present invention can improve quality of mass production by providing accurate measurement systems. Some embodiments of the present invention provide a traceable calibration chain for cross-fabrication-plant metrology tools. Certain embodiments of the present invention apply statistical methods to identify a golden tool to make the calibration chain traceable.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for calibrating a plurality of metrology tools for a semiconductor fabrication process, the method comprising:
    obtaining a first plurality of calibration standard wafers, the first plurality of calibration standard wafers being associated with a plurality of predetermined values;
    measuring the first plurality of calibration standard wafers by a plurality of metrology tools to obtain a first plurality of measured values;
    processing information associated with the first plurality of measured values;
    selecting a first metrology tool from the plurality of metrology tools based on at least information associated with the first plurality of measured values;
    calibrating the first metrology tool with the first plurality of calibration standard wafers;
    obtaining a plurality of working standard wafers;
    measuring the plurality of working standard wafers by the selected first metrology tool to obtain a second plurality of measured values;
    associating each of the second plurality of measured values with a corresponding one of the plurality of working standard wafers; and
    calibrating a second metrology tool of the plurality of metrology tools with the plurality of working standard wafers associated with the second plurality of measured values.

2. The method of claim 1 wherein the first plurality of calibration standard wafers includes a plurality of VLSI golden wafers traceable to a worldwide acceptable origin such as NIST.

3. The method of claim 1 wherein the plurality of predetermined values is associated with at least one selected from a group consisting of sheet resistance, film thickness, and critical dimension.

4. The method of claim 1 wherein the plurality of working standard wafers are made from regular bare wafers.

5. The method of claim 4 wherein the second plurality of measured values is associated with at least one selected from a group consisting of sheet resistance, film thickness, and critical dimension.

6. The method of claim 1 wherein the plurality of predetermined values are used as true values for the first plurality of calibration standard wafers.

7. The method of claim 1 wherein the second plurality of measured values are used as true values for the plurality of working standard wafers.

8. The method of claim 1 wherein the first metrology tool and the second metrology tool are different.

9. The method of claim 1 wherein:
the selecting a first metrology tool from the plurality of metrology tools comprises selecting the first metrology tool from the plurality of metrology tools based on at least information associated with one selected from a group consisting of measurement biases, liner performances, and total uncertainties; and
the group consisting of measurement biases, liner performances, and total uncertainties is related to at least the first plurality of measured values.

10. The method of claim 1 wherein:
the processing information associated with the first plurality of measured values comprises determining a plurality of uncertainties for the plurality of metrology tools, each of the plurality of uncertainties being associated with one of the plurality of metrology tools; and
the selecting a first metrology tool from the plurality of metrology tools comprises selecting the first metrology tool from the plurality of metrology tools based on at least information associated with the plurality of uncertainties.

11. The method of claim 10 wherein the plurality of uncertainties is a plurality of total uncertainties.

12. The method of claim 10 wherein the first metrology tool is associated with a first uncertainty, the first uncertainty being the smallest one among the plurality of uncertainties.

13. The method of claim 1 wherein the first plurality of calibration standard wafers are calibrated against at least one standard associated with a worldwide acceptable origin.

14. The method of claim 13 wherein the worldwide acceptable origin is the National Institute of Standards and Technology.

15. A method for calibrating a plurality of metrology tools, the method comprising:
obtaining a first plurality of calibration standard wafers, that are associated with a plurality of predetermined values and calibrated against at least a first standard associated with a first worldwide acceptable origin;
measuring the first plurality of calibration standard wafers by a plurality of metrology tools to obtain a first plurality of measured values;
processing information associated with the first plurality of measured values;
selecting a first metrology tool from the plurality of metrology tools based on at least information associated with the first plurality of measured values;
calibrating the first metrology tool with a second plurality of calibration standard wafers that are calibrated against at least a second standard associated with a second worldwide acceptable origin;
obtaining a plurality of working standard wafers;
measuring the plurality of working standard wafers by the first metrology tool to obtain a second plurality of measured values, each of the second plurality of measured values corresponding to one of the plurality of working standard wafers; and
calibrating a second metrology tool of the plurality of metrology tools with the plurality of working standard wafers associated with the second plurality of measured values.

16. The method of claim 15 wherein the first worldwide acceptable origin and the second worldwide acceptable origin are the same.

17. The method of claim 15 wherein the first worldwide acceptable origin and the second worldwide acceptable origin are different.

18. The method of claim 15 wherein the first plurality of calibration standard wafers and the second plurality of calibration standard wafers are the same.

19. The method of claim 15 wherein the first plurality of calibration standard wafers and the second plurality of calibration standard wafers are different.

20. A method for calibrating a plurality of metrology tools, the method comprising:
obtaining a first plurality of calibration standard wafers that are associated with a plurality of predetermined values;
measuring the first plurality of calibration standard wafers by a plurality of metrology tools to obtain a first plurality of measured values;
processing information associated with the first plurality of measured values;
determining a plurality of uncertainties for the plurality of metrology tools based on information associated with the first plurality of measured values;
selecting a first metrology tool from the plurality of metrology tools based on at least information associated with the plurality of uncertainties;
calibrating the first metrology tool with the first plurality of calibration standard wafers;
obtaining a plurality of working standard wafers;
measuring the plurality of working standard wafers by the first measurement system to obtain a second plurality of measured values; and
calibrating a second metrology tool of the plurality of metrology tools with the plurality of working standard wafers associated with the second plurality of measured values.

21. The method of claim 20 wherein the plurality of uncertainties is a plurality of total uncertainties.

22. The method of claim 20 wherein the first metrology tool is associated with a first uncertainty, the first uncertainty being the smallest one among the plurality of uncertainties.

* * * * *